Oct. 4, 1938.       H. HUBER ET AL       2,132,167
PROCESS OF PRODUCING DRY ENZYMATIC PREPARATION FROM ANIMAL ORGANS
Filed April 16, 1936
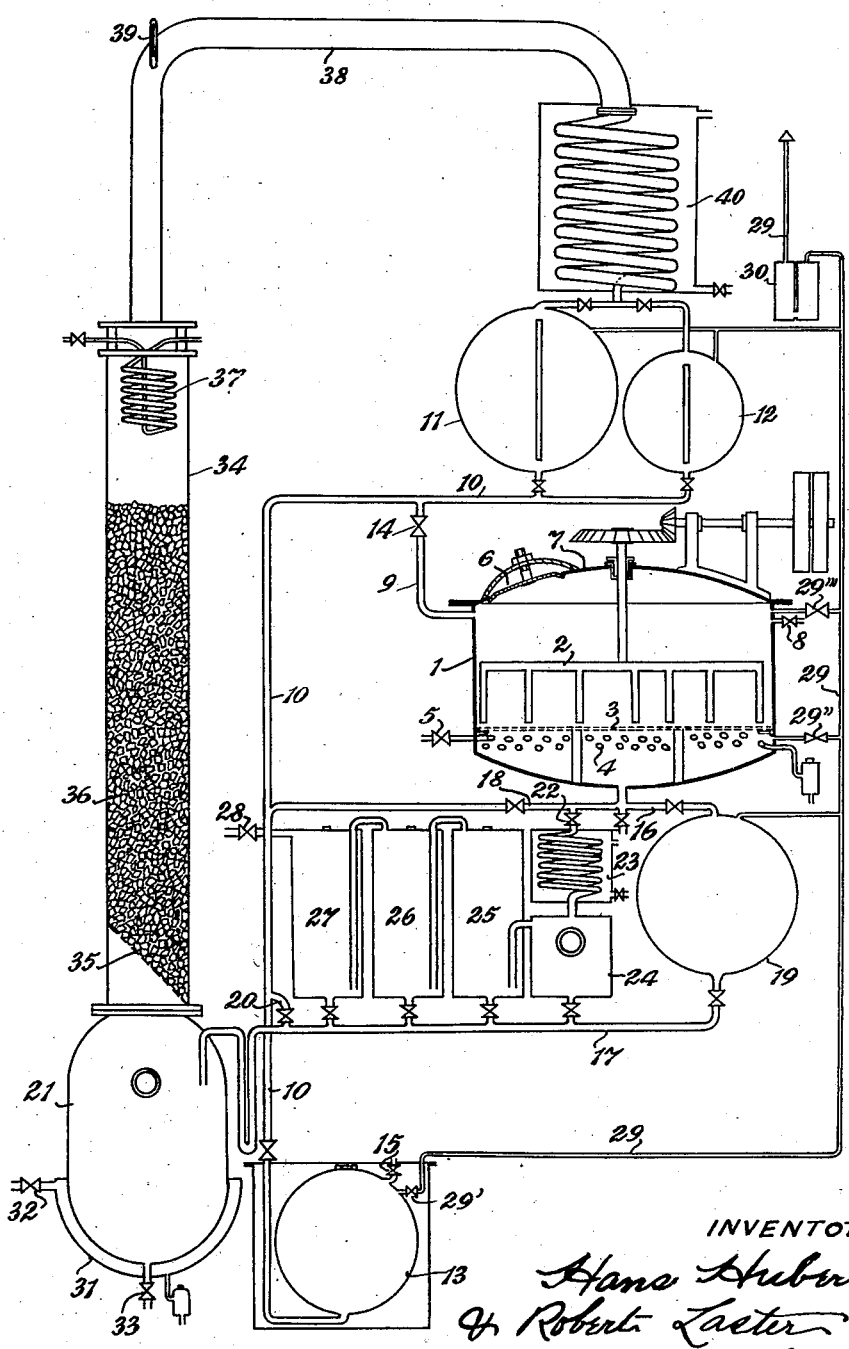
INVENTORS
Hans Huber
& Robert Laeter
By Watson, Coit, Moses & Grindle
ATTY'S.

Patented Oct. 4, 1938

2,132,167

UNITED STATES PATENT OFFICE 2,132,167

PROCESS OF PRODUCING DRY ENZYMATIC PREPARATION FROM ANIMAL ORGANS

Hans Huber and Robert Laster, Vienna, Austria, assignors to Hauser & Sobotka A. G., Stadlau, Germany, a joint-stock company Application April 16, 1936, Serial No. 74,799
In Austria May 9, 1935

1 Claim. (Cl. 195—65)

This invention relates to the production of enzymatic preparations from animal organs, and more particularly from glands such as for instance pancreas gland.

It is an object of this invention to provide a method for obtaining in one continuous run a stable preparation of active principles of animal organs, which contain the enzymes of the organ under treatment in as far as possible an unaltered state.

A further object of this invention is to provide an improved method for obtaining dry preparations of perfect stability containing the principles of the organ under treatment together with the whole of the dehydrated and defatted cellular elements of the organ.

A still further object of this invention is to develop a method for dehydration of and removing fat from disintegrated glands with the aid of lixiviation only, preferably while using one and the same solvent during a continuous working operation, and recovering the whole of the solvent used.

Other objects and advantages appear in the specification and in the claims.

Dry preparations from entire glands, that is to say dry preparations which contain the whole of the natural mixture of the ferments present in the gland in a stable (dry) form, are as a rule produced from the animal organs concerned by intermixture of the comminuted organs (or aqueous extracts thereof) with salts free from water of crystallization or with absorbent materials, and subsequent careful drying. It is also known to treat the pre-dried organs with organic solvents for the purpose of eliminating fat. In all the known processes of this kind the dehydration and fat removing, insofar as fatless preparations of organs are obtained at all, are carried out in two separate working stages.

For the preparative production of pancreas lipase it has been proposed to dehydrate and defat the pulp obtained by comminution of the gland, directly with the aid of large quantities of organic solvent, for which purpose the pulp is washed, consecutively, with acetone, acetone and ether, and finally with ether alone, and then dried in the air, after which the air-dried powder is subjected to extraction with glycerine for the purpose of obtaining a crude lipase solution.

Finally, for the production on a technical scale of a preparation containing the entire ferments of the pancreas in a dry form a process has become known in which the aqueous gland pulp is directly subjected to extraction. In this process the whole extraction is carried out with acetone alone, the carefully comminuted fresh gland being first subjected to a short pre-treatment with a considerable quantity of ordinary acetone, after which the residue obtained by filtering off the solvent is pressed to render it suitable for exhaustive extraction with anhydrous acetone. After this treatment with anhydrous acetone, which is repeated twice, the residue of extraction is left to stand until the last traces of the solvent have evaporated, after which the air-dried product is finely comminuted.

Like this known process the present invention aims at obtaining dry preparations from entire glands, and more particularly from the pancreas of animals by direct dehydration and removal of fat from the aqueous gland pulp with the aid of a single solvent, and more particularly of acetone, and thereby recovering in as far as possible unaltered state the natural ferment mixture in the form of the dry residue of extraction. The essence of the present process consists in treating with the solvent the pulp obtained by comminution of the glands, in a closed system in the manner of extraction by continuous operation, with repeated circulation of the solvent, which is intermediately freed, by reflux-distillation, from water and the extracted substances, and continuing such treatment until the pulp is practically completely dehydrated and freed from fat, after which the pulp is freed in situ from the residual solvent, and dried. This whole treatment is carried out in a device of the type of the known extracting plants for continuous operation which effect recovery of the solvent, by distillation, from the solvent charge enriched with extracted matter, and which thus maintain the solvent automatically in circulation. In contrast to the known process mentioned above, there is the very essential difference of an uninterrupted run, seeing that the aqueous pulp obtained by comminution of the glands is treated in closed extracting apparatus of the nature indicated without interposed dehydration by expressing, both for fat removal and also for conversion into the dry state. Thus in the first place there is avoided loss of the substances which would be removed with the expressed juice, while in the second place practically complete recovery of the solvent is ensured.

It is a sine qua non of the process that the single solvent used, not altering as to composition at boiling, be capable of dissolving both water and fat; the same result can also be achieved with a mixture of solvents, for example acetone and chloroform, of the nature of the so-called azeotropic solvent mixtures which distill without alteration of composition.

The practising of the process according to the present invention will be described in connection with the production of a dry preparation from the pancreas, this being taken as an example.

As starting material there are preferably employed fresh glands or glands preserved by salting or freezing, the preferred starting material being the pancreas of hogs or cattle; preparations from hog's glands are well known to be the more efficacious. The pancreas is passed through a chopping machine, and the chopped material comminuted a second time. The pulp is then placed in the extractor and covered with acetone which, after having been left to stand for a suitable length of time on the material, is freed, in the still, from water and the non-volatile extractives, condensed, and returned into the extractor. This procedure is continued until a test sample taken from the extractor shows that the extracting agent is free from water and fat. When this condition has been reached the solvent is run off, and the extraction residue freed from the residual traces of solvent by heating and exhausting of the extractor, or by passing hot air therethrough. The driven off solvent vapors are preferably made to pass first through a condenser with a receiver to catch the condensed matter, and then through a series of absorption vessels which are charged partly with water, but at the end of the series preferably with sodium bisulphite solution, in order to retain the last traces of the acetone used. Both the acetone directly obtained as a liquid deposit by condensation and also the contents of the absorption vessels, pass eventually into the still for the purpose of the recovery of the solvent contained therein. The sodium bisulphite solution is distilled with the addition of soda.

According to a particular embodiment there are recovered from the residue remaining in the still after the solvent has been distilled off, and preferably after the congealed fat has been skimmed off, substances occurring naturally in the glands, and more particularly water-soluble colloids of the nature of the protective colloids which may have passed into solution in the course of the process of extraction; these substances can then be added, in a liquid or solid form, to the dry preparation from the entire gland or to the aqueous solutions produced from such preparations. The colloids can for example be precipitated out or salted out with neutral salts under conditions of acid reaction, preferably at a H ion concentration corresponding to the isoelectric point. It is advisable for this purpose to use salts which are thought to serve as activators in the finished preparation. Since these colloids represent in the main proteins or protein decomposition products, it is also possible to utilize all other methods of protein precipitation for this purpose.

For the carrying out of the process there is employed the device shown diagrammatically, by way of example, in the accompanying drawing.

The apparatus consists of an extractor 1 with stirring means 2 and a double screen bottom 3 beneath which there is provided a coil 4 for indirect heating by means of steam. Between the two screens there is placed a filter cloth. The supply of steam to the coil 4 is regulated by means of a valve 5. The lid 7 of the extractor, which is provided with a man-hole 6, is removable together with the stirring means 2. Through the branch pipe 8 connected to the upper part of the extractor air can be let in after the treatment in a vacuum is finished.

Through the pipes 9 and 10 the extractor 1 communicates with two parallel connected solvent containers 11 and 12 in the supply pipes of which valves are interposed. Through the pipe line 10 the two containers 11 and 12 communicate with a supply tank 13 the filling line 15 of which can be closed off by means of a valve. The pipe 9 can be disconnected from the pipe 10 by means of a valve 14. From the bottom of the extractor 1 there branch off two pipe lines 16 and 18 of which the one (16) leads, across the miscella container 19, through the pipe 17, to the still 21, while the pipe line 18 discharges across a valve into the pipe 10 and is connected to the pipe line 17 through a valve-controlled pipe 20 branching off the pipe 10.

The pipe line 18 communicates, through a length of pipe controlled by a valve 22, with a condenser 23 adjoining which there is provided a receiver 24. The non-condensed vapors pass out of the receiver 24 and through the absorption vessels 25, 26, and 27. The receiver and each of the absorption vessels is connected by a length of pipe governed by a valve, to the pipe line 17. The discharge pipe from the last absorption vessel 27 is adapted for connection, through a valve 28, to an exhausting or vacuum pipe line.

The solvent containers 11, 12, the storage tank 13, the miscella container 19, and the extractor 1 are in communication with the outside atmosphere through the pipe 29 and washing bottle 30. The branch pipe from the pipe 29 to the storage tank 13, and the two branches connected into the extractor 1 at the top and at the bottom, are equipped with valves 29', 29", and 29"'.

The still 21 is provided with a steam heated double jacket 31. The steam supply to this jacket is regulated by means of the valve 32. 33 denotes the valve interposed in the discharge pipe from the still.

The still 21 communicates with a column 34 fitted with an inclined grating 35 on which there is piled filling material 36, consisting for example of filter rings (Raschig rings). In the upper part of this column there is provided a cooling coil 37. The pipe line 38, in which there is provided a temperature measurer 39, connects the column 34 with a condenser 40 which is connected to the two solvent containers 11, 12 by means of valve-controlled pipes.

To start up the apparatus solvent is first forced up from the storage tank 13, with the aid of a pump connected to the branch pipe 15, through the pipe line 10 into the solvent containers 11 and 12. The material to be subjected to extraction, after having been comminuted for example by being passed through a meat mincing machine, is then introduced through the man-hole 6 on to the partition floor 3 of the extractor 1. The man-hole is then shut down again, one of the lower valves of the containers 11, 12 and the valve 14 are opened, and solvent is allowed to flow into the extractor through the pipes 9 and 10 until the charge of material to be subjected to extraction is completely covered with solvent. During this procedure the valve 29"' is left open so that equalization of pressure can take place. According to the nature of the material subjected to extraction, the solvent is left for a shorter or longer time on this material, with the stirrer 2 in operation, after which the solvent contained in the extractor is run off through the pipe line 16 into the miscella container 19, and thence through the pipe line 17 into the still. The solvent contained in the extractor can also be caused to flow by a different route into the still 21, namely through the pipes 18, 10, branch pipe 20, and pipe line 17. The solvent run off is replaced by fresh solvent.

In the still 21 the solvent is distilled off from the discharged extract. The resulting vapors pass through the column 34 to the cooling coil 37, the water content becoming thereby completely condensed and caused to flow back into the still 21, while the solvent vapors pass through the pipe 38 into the condenser 40 whence the condensate flows off into one of the solvent containers 11, 12.

When extraction is finished, heating steam is passed through the coil 4 (after the solvent contained in the extractor has been run off) for the purpose of driving off the residual solvent still present in the residue of extraction. During this process the valves in the pipes 16 and 18 behind the extractor are closed, while the valve 22 is opened. The vacuum is then connected on at 28. The drawn off solvent vapors consequently flow into the condenser 23 whence the liquefied solvent flows off into the receiver 24, while the non-condensed vapors pass through the absorption vessels 25—27. The contents of the receiver and of the absorption vessels are drawn off as required through the pipe line 17 into the still 21, after closing 18 and opening 8.

When the whole of the solvent has been expelled from the material subjected to extraction, the valves 5 and 22 are closed, the lid 7 lifted off together with the stirrer 2, and the spent material removed and then preferably ground in a cross-beater mill with fine screens. After cleansing of the floor 3, and changing of the filter cloth, the extractor is ready for work again.

The extract remaining in the still is drawn off through the tap 33.

It is an essential feature of the present process that the pulp, after having been introduced into the extractor, remains therein during the whole operation, including all repeated steps of lixiviation with the solvent until the pulp is substantially dehydrated and defatted, and during the removal of the residual solvent liquid from the dehydrated and defatted pulp. The expression "in situ" is used in the following claim to define this feature.

What we claim is:

A process for the production of dry enzymatic preparations which comprises comminuting pancreas glands to the form of a pulp, adding acetone to the said pulp, allowing the acetone to penetrate into the said pulp, moderately agitating the said pulp with the imbibed acetone, running off from said pulp liquid containing acetone, water, fat and other extracted substances, distilling the thus removed liquid to recover purified acetone, reintroducing the purified acetone into said pulp in situ, repeating the said steps until the pulp in situ is substantially dehydrated and defatted, applying moderate heat to said dehydrated and defatted pulp in situ in an atmosphere of reduced pressure so as to drive off residual acetone from said dehydrated and defatted pulp, recovering the acetone thus driven off, and collecting the dehydrated, defatted and dry pancreatic material.

HANS HUBER.
ROBERT LASTER.